3,180,629
HEATING INSTALLATION WITH AUTOMATIC CONTROL STRUCTURE
Eberhard Goeke and Ernst Kumper, Essen, Germany, assignors to Heinrich Koppers G.m.b.H., Essen, Germany
Filed Feb. 18, 1963, Ser. No. 259,038
Claims priority, application Germany, Feb. 16, 1962, K 45,915
5 Claims. (Cl. 263—19)

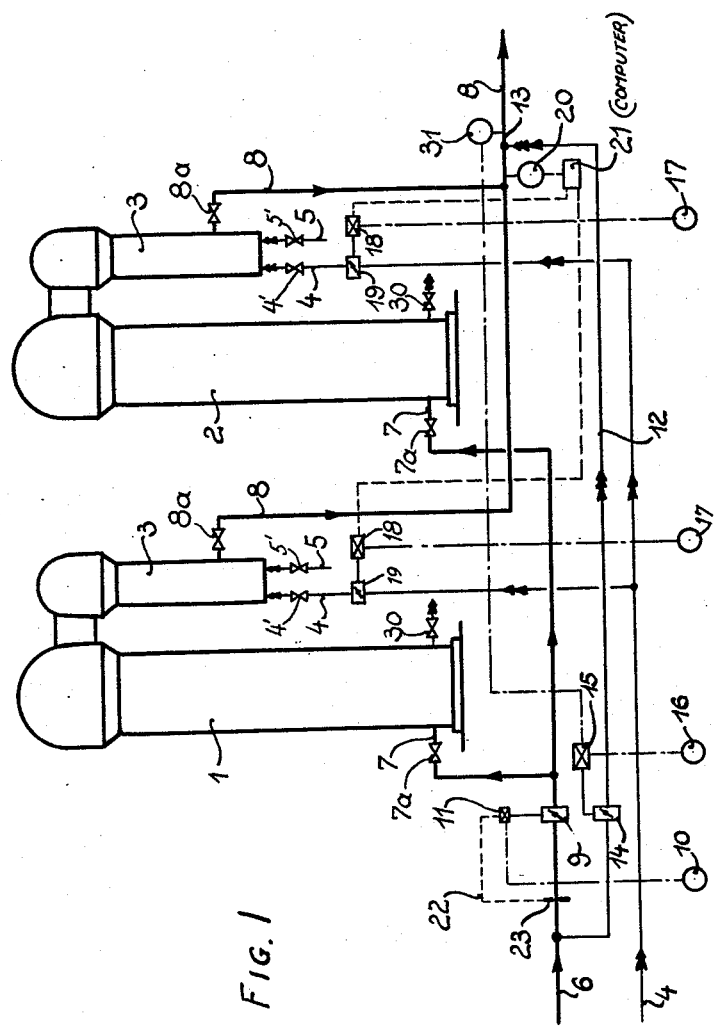

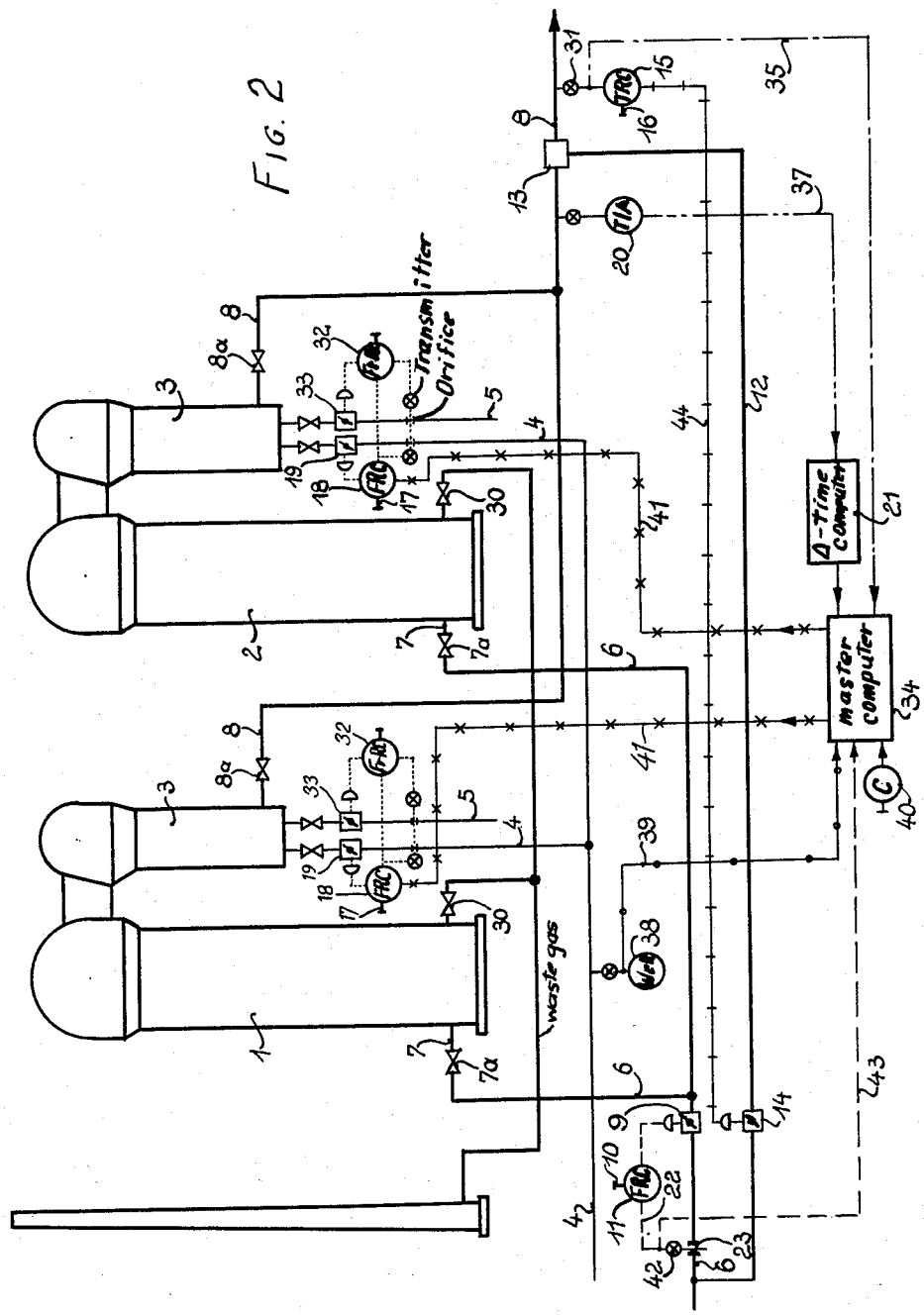

The present invention relates to heating assemblies and in particular to automatically controlled heating assemblies.

The present invention is particularly applicable to heating assemblies of the type which are used to provide the hot blast which is used in a blast furnace. In conventional installations of this type there are a plurality of heating assemblies one of which, at any given moment, is said to be on wind, inasmuch as it is heating a relatively cool gas to provide the hot blast, while at the same time at least one other one of the plurality of heating assemblies is said to be on gas, inasmuch as it is being heated. For example, in a conventional installation there may be four heating assemblies of this type, each of which will be on wind for one hour and on gas for three hours so that each of the assemblies performs a two-step cycle which includes an on-wind step followed by an on-gas step. Thus, while one of the heating assemblies is on wind, the other three heating assemblies are on gas, and after a period of approximately one hour the temperature of the hot blast as derived from the air which is heated in the heating assembly which is on wind will be so low that in an automatic manner this assembly will end its on-wind step and will start its on-gas step while that one of the remaining heating assemblies which has been on gas for three hours will be switched to its on-wind step so that the supply of the hot blast will be continued.

During the on-gas step of each cycle the heating assemblies which are on gas are heated by combustion of a suitable combustible gas such as blast furnace gas, and the products of combustion are simply discharged from the heating assemblies which are on gas to a chimney or the like, for example, during the heating of the assemblies when they are on gas. When the heating assemblies are on wind, the heating thereof is of course terminated and now the relatively cool air flows through the particular heating assembly which is on wind to be heated therein and to be delivered through a suitable conduit to the blast furnace, for example. With such arrangements the air which is derived from each heating assembly at the start of its on-wind step is at an extremely high temperature, and of course the temperature of this air diminishes rapidly as the on-wind step of each cycle progresses. In order to maintain a substantially constant temperature for the hot blast of the relatively cool air is mixed with the hot blast, and as each on-wind step progresses the amount of relatively cool air which is mixed with the hot blast is automatically and progressively reduced so that in this way the temperature of the hot blast is maintained substantially constant. Of course, as the end of the on-wind step is approacched the temperature of the air derived from the particular heating assembly which is on wind will be just about equal to the desired substantially constant temperature and almost no relatively cool air will be mixed with the air which is derived from the heating assembly which is on wind.

Conventional structure for automatically regulating such heating installations will, for example, operate the heater of each heating assembly in such a way that as a minimum each assembly will be heated to such an extent that it will be capable of providing the amount of heat necessary for the particular operations which are being carried out. Thus, it is possible to adjust automatic controls of this type so that in accordance with the desired amount and temperature of the heated fluid such as the hot blast, the heating means of each heating assembly will be regulated to heat each assembly to an extent which will provide the desired temperature and amount of fluid. With conventional heating installations of this type, the temperature of the gas exhausting from a heating assembly when it is on gas is measured and when the temperature of this exhaust gas reaches a predetermined maximum value the heating of the assembly will terminate since the assembly has been heated to the extent sufficient to provide the heat which is required for the particular operations which are to be carried out.

It is to be noted, however, that each heating assembly will be heated, when it is on gas, to the desired extent only if it is not switched to the on-wind step before the desired temperature of the exhaust gas is reached during the on-gas step. Thus, if it should happen that the heating assembly which is on wind has reached the end of the on-wind step, which is to say can no longer provide a heated fluid with a temperature above a given minimum, then it will be necessary to switch the next heating assembly to its on-wind step even if the exhaust gas thereof has not yet reached the desired temperature. Of course, it is not always possible to operate under precisely controlled conditions, and where the temperature of the heated fluid derived from the assembly which is on wind drops off prematurely for some uncontrollable reason it will be necessary to switch the next assembly on wind even if it has not been heated to the required extent, since this is the only way in which a continuous supply of heated fluid can be maintained.

The difficulty with the conventional installations of this type is that when the installation operates in the above-described manner, there is a chain reaction resulting in an unavoidable increase of the undesired type of operation until it becomes impossible to carry out the operation in an orderly manner. For example, if it is necessary to prematurely stop the on-wind step of one heating assembly, then of course it becomes necessary to start the on-wind step of the next assembly prematurely so that this latter assembly has not been heated to the desired extent with the result that the on-wind step thereof must be terminated even sooner, and of course the next following heating assembly will have to be switched to its on-wind step in an even shorter period of time, so that eventually all of the units are on gas for progressively shorter periods of time and also on wind for progressively shorter periods of time until it simply becomes impossible to continue the operations in a satisfactory manner. Of course, the end of the on-wind step of a given cycle is determined, for example, by the temperature to which the heated fluid derived from the assembly which is on wind has dropped, and once this minimum temperature is reached it becomes essential to terminate the on-wind step since otherwise the heated fluid which is delivered from the heating installation will simply be too cold.

In order to prevent deterioriation of the operations in the manner referred to above, it is necessary for the heaters of the assemblies to be regulated by hand so as to supply more heat to the assemblies, and the installation is adjusted in such a way that each heating assembly is fully heated, which is to say the exhaust gas issuing therefrom during the on-gas step reaches its maximum temperature before the end of the on-wind step of whichever one of the assemblies happens to be on wind. In this case the duration of the on-wind step of each cycle is merely a function of the load of the installation. For example, if the installation is operated at 50% of its capacity, then each on-wind step will have a duration which is twice the duration of the on-wind step at 100% load conditions.

Naturally, this latter type of operation is extremely undesirable because it is uneconomical. The greatest economy of operation is attained only when predetermined durations of the on-wind and on-gas steps are maintained while the average temperature of the exhaust gas of each assembly which is on gas is as low as possible. If, however, the several heating assemblies are operated in such a way that at the end of the on-gas step a maximum temperature of the exhaust gas is attained, it follows that the average temperature of the exhaust gas is much higher than the lowest possible value of this average temperature, with resulting unnecessary costs.

It is thus a primary object of the present invention to provide for a heating installation of the above type an automatic control structure which will maintain the average temperature of the exhaust gas of each heating assembly when it is on gas at the lowest possible value while still heating each assembly to an extent sufficient to prevent premature termination of the on-wind step.

It is furthermore an object of the present invention to provide for a heating installation of the above type an automatic control structure which will maintain the duration of each on-wind step substantially constant irrespective of the loading of the installation.

Also, it is an object of the present invention to provide a structure which will automatically control a heating installation of the above type in such a way that during the on-gas step of each cycle each heating assembly will only be heated to an extent which is sufficient to provide the desired amount of heat for a predetermined duration during each on-wind step.

A further object of the present invention is to provide a control structure which can be connected to existing, known heating installations to automatically control these installations in the manner described above.

Also, it is an object of the present invention to provide a control structure of the above type which is exceedingly simple and reliable in operation.

With these objects in view the invention includes, in a heating installation, a plurality of heating assemblies which are adapted to carry out two-step cycles each of which includes an on-wind step followed by an on-gas step with at least one of these heating assemblies being on wind while at least one other assembly is on gas, and each of these heating assemblies includes a heating means, for heating the assembly when on gas, and a control means connected to the heating means for controlling the amount of heat supplied by the heating means. A calculating means is capable of being adjusted so as to provide a predetermined duration of the on-wind step of each cycle, and the calculating means is capable of comparing the actual duration of a given on-wind step with the predetermined duration thereof which is set into the calculating means, and this calculating means is connected with the control means of each of the heating assemblies to automatically adjust the control means so as to regulate the heat provided by each heating means inversely with the difference between the actual duration of the on-wind step with the predetermined duration thereof. Thus, if the actual duration of the on-wind step of a given cycle is less than the predetermined duration which is set into the calculating means, then the control means will be automatically adjusted to provide more heat during the on-gas step, while if the actual duration of a given on-wind step is greater than the predetermined duration means will be automatically adjusted to provide less heat during the on-gas step.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompany drawings, in which one possible structure according to the present invention is diagrammatically illustrated together with a heating installation which is also diagrammatically illustrated.

In the drawing,

FIG. 1 diagrammatically illustrates one possible embodiment of a structure according to the present invention; and FIG. 2 shows the structure of FIG. 1 with additional details.

Referring to FIG. 1, there is shown therein a heating installation which includes two heating assemblies, although in practice it is to be understood that there may be more heating assemblies. For example, as was pointed out above, in practice there may be four heating assemblies three of which at any given time are on gas while one is on wind, where the on wind step of each assembly has a duration of 1 hour and the on-gas step of each assembly has a duration of 3 hours. For the sake of convenience only two assemblies are shown in the drawing. Each of the heating assemblies includes a heater which may, for example, take the form of a suitable regenerator containing a checkerbrick heat-exchanging structure as is well known in the art. Thus, the drawing illustrates the heating unit 1 of one assembly and the heating unit 2 of the second assembly. The domes of the heating units 1 and 2 are respectively connected through a suitable conduit with the heating means 3 of each assembly, although it is to be understood that the invention is equally applicable to installations in which the heating means are built into the heating units 1 and 2. A combustible gas, such as blast furnace gas, is delivered to each heating means 3 through a conduit 4, and air is delivered thereto through a conduit 5, and when a given heating assembly is on gas the mixture of gases flowing through the conduits 4 and 5 into the heating means 3 is burned so as to heat the heating assembly, and at this time the valve 30 of each heating unit will be opened so that the heating gas will discharge from the unit through the valve 30 to a suitable chimney, for example, although use may be made of this heating gas in a manner well known in the art.

A cold conduit means 6 is provided for delivering a relatively cool fluid to each heating assembly to be heated therein during the on-wind step of each cycle. Thus, the cold conduit means 6 includes the branches 7 which respectively communicate with the heating units 1 and 2, and when one assembly is on wind the valve 7a will be open while when it is on gas the valve 7a will be closed. Of course, when a given assembly is on wind the valve 30 is closed while when it is on gas the valve 30 is open, and an automatic structure well known in the art is capable of actuating these valves so as to switch one assembly from on wind to on gas while another assembly is switched simultaneously from on gas to on wind. A hot conduit means 8 receives the heated fluid from whichover assembly is on wind at any given time, and for this purpose the valve 8a which communicates with the assembly which is on wind will be open. Thus, in the illustrated example the structure can be assumed as being shown in a position where the assembly which includes the unit 1 is on wind while the assembly which includes the unit 2 is on gas, and at this time the valve 8a which communicates with the left assembly of the drawing will be open and also the valve 7a of this left assembly will be open while the valve 30 of the left assembly of the drawing will be closed, and at the same time the assembly which includes the heating unit 2 will be on gas with the valves 7a and 8a thereof closed and with the valve 30 thereof open. Of course, when a given heating assembly is on wind, the valves 4', 5' of the conduits 4 and 5 of the assembly which is on wind are closed and the heating means 3 thereof does not operate since at this time the heated fluid after passing upwardly through the heating unit will flow down through the heating means 3 and out through the hot conduit means 8.

The cold conduit means 6 includes a valve 9 capable of being controlled by a regulating means 11 which can be preset through a manually-operable device 10, and in this way the amount of fluid which is to be heated can be regulated. The control device 11 is connected through a connecting structure 22 with an orifice 23 located in the cold conduit means 6. As was pointed out above, in the position of the structure illustrated it is assumed that the heating unit 1 is on wind.

A mixing conduit means 12 communicates with the cold conduit means 6 upstream of the heating assemblies and with the hot conduit means 8 downstream of the heating assemblies so that the mixing conduit means 12 can deliver, at its junction 13 with the hot conduit means 8, relatively cool fluid to the fluid in the hot conduit means 8 so as to reduce the temperature of the fluid in the hot conduit means 8. In order to maintain a uniform temperature of the fluid flowing in the hot conduit means 8 during each on-wind step, an adjustable valve 14 is provided in the mixing conduit means 12 and is capable of being operated by a regulating device 15 in accordance with the temperature of the gas or other fluid in the hot conduit means 8. Thus, it will be seen that a sensing device 31, which may be of any known construction, senses the temperature of the fluid in the hot conduit means 8 downstream of the junction 13 and in accordance with the temperature which is sensed by the device 31, this device 31 through its connection to the regulating device 15 will automatically control the latter so that the regulating device 15 will control the valve 14 automatically to maintain at all times an amount of relatively cool gas flowing through the conduit means 12 into the conduit means 8 which will maintain the desired constant temperature of the gas. In this way, where the installation is used with a blast furnace, the temperature of the hot blast which is delivered by the conduit 8 to the furnace can be maintained substantially constant. The preselected temperature of the hot blast or other fluid delivered by the hot conduit means 8 to a desired location can be preset by the manually operable adjusting device 16 which is operatively connected to the regulating device 15 so that this regulating means 15 can be preset to provide a desired temperature of the fluid which is delivered by the hot conduit means 8.

Thus, through manipulation of the adjusting units 10 and 16 it is possible to set the heating installations so that it will provide a selected amount of heated fluid at a selected temperature, and of course the amount and temperature of the fluid delivered will correspond to the requirements of the device to which the heated fluid is delivered by the hot conduit means 8. It can easily be determined from experience as well as from tables and from curves of operation what setting should be provided to provide through the heating means 3 of the assembly which is on gas an amount of heat which will be sufficient to heat an assembly which is on gas to an extent which will provide during the subsequent on-wind step the heat called for by the settings made with the devices 10 and 16. Thus, in accordance with such tables, curves, or the like, the operator will set a manually operable adjusting device 17 to a setting which will correspond to the settings of the devices 10 and 16. The manually operable adjusting device 17 is connected to a control or regulating means 18 so as to set the latter, and this means 18 is operatively connected with a valve 19 which controls the amount of combustible gas which flows through the combustible gas conduit 4 to the burner 3 of the particular installation which is on gas. Thus, in the illustrated example in accordance with the settings of the adjusting devices 10 and 16 the adjusting device 17 has been set so as to provide through the heating means 3 of the right assembly of the drawing an amount of heat, during the period when the unit 2 is on gas, which will be sufficient to heat the later to an extent which will provide the required amount and temperature of heated fluid when the right heating assembly of the drawing is switched over to the on-wind step. Of course, instead of referring to tables, curves, or the like to determine the initial setting of the control means 18, it is also possible to initially control the extent to which a heating assembly is heated when on gas in accordance with the adjustments for the amount of gas and temperature of the gas as well as in accordance with further variables such as the operating characteristics of the particular assembly and other factors, by introducing all of these factors into a conventional computer e.g. of the type described by U.S. Pat. 2,877,445, which is operatively coupled with the control means 18 so as to automatically set the latter at a setting which is correct for the settings of he devices 10 and 16 and for the particular characteristics of the particular heating assembly, and in this way it is possible to automatically provide, even initially, a heating which is as accurate as possible.

Upstream of the junction 13 between the mixing conduit means 12 and the hot conduit means 8, there is operatively connected to the hot conduit means 8 a sensing means 20 which senses the temperature of the heated fluid before it reaches the junction 13 where the relatively cool fluid is mixed therewith. The sensing means 20 can be regulated, in a manner well known in the art, so that it will become energized when in conduit 8 the temperature of the heated fluid, before it is mixed with the relatively cool fluid, has dropped to a preselected minimum. Thus, when the temperature of the fluid in the hot conduit means 8 upstream of the junction 13 reaches or closely approaches the temperature which is set by the device 16 the sensing means 20 will become automatically energized. Of course, this energizing of the sensing means 20 will signal the end of the on-wind step of the respective thus operating heating installation. It is also possible to signal the end of the on-wind step of a given cycle through an impulse other than that derived from a temperature sensing device such as the device 20. For example, it is possible to sense the amount of fluid delivered through the mixing conduit means 12 to the hot conduit means 8, and when this amount of fluid drops to such a low value that there ceases to be any cooling fluid delivered through the mixing conduit means 12 or where there is almost no fluid flowing through the mixing conduit means 12, then a device which senses this fact can also become automatically energized to signal the end of the on-wind step.

A calculating means 21 is operatively connected to the sensing device 20 so as to be energized and actuated thereby. This calculating means 21 has been preset so as to provide a preselected duration for the on-wind step of each cycle. When the impulse from the sensing means 20 is delivered to the calculating means 21, this calculating means 21 is capable of comparing the actual duration of the on-wind step with the predetermined duration thereof which have been previously set into the calculating means 21. Calculating structures of this type are well known in the art e.g. by U.S. Patent No. 2,877,445.

The calculating means 21 is connected with the control means 18 which regulates the amount of heat provided by each heating means 3 so as to automatically adjust the control means of each assembly to regulate the heat provided by each heating means inversely with the difference between the actual duration and the predetermined duration of the on-wind step. For example, if it is assumed that each heating assembly is to have an on-wind step which should last for 1 hour, and if the signal from the sensing means 20 is delivered to the calculating means 21 after a period of 58 minutes, which is to say two minutes too soon, then it is clear that the actual duration of the on-wind step was $1/30$ too short, and thus the amount of heat delivered to the heating assembly during the on-gas step of its cycle was insufficient by 1/30. In this case the calculating device 21 automatically regulates the control means 18 so as to adjust it to increase the amount of heat provided by the heating means 3 by 1/30, and thus when the heating assembly which is on gas is subsequently switched to on wind it will provide the desired temperature and amount of heated fluid for the preselected, predetermined duration of the on-wind step.

Referring to FIG. 2, it can be assumed that the unit 1 is on wind. The amount of cool wind which is fed to the unit 1 to be heated therein is controlled by the above-described FRC (flow recording controller) 11 which is located in the conduit 22. By means of the TRC (temperature recording controller) 15 the temperature of the hot blast is maintained constant by adjusting the valve 14 which is controlled from TRC 15 through the connecting line 44. The heating of the unit 2 which is on gas is controlled by FRC 18 which controls the valve 19 located in the combustible gas conduit 4, this heating of the unit 2 also being influenced by FRRC (flow ratio recording controller) 32 which adjusts the valve 33 in the air conduit 5.

The essential factors for providing optimum heating of the unit which is on gas, which is to say optimum use of the amount of heat which is supplied to the heating unit, are the following:

(1) the amount of cold wind which flows through a heating unit within a given period of time to be heated therein;

(2) the calculated temperature of the mixture of cold and hot gas;

(3) the temperature of the hot blast with reference to the amount of cold wind which flows through the structure in a given period of time;

(4) the heat content of the combustible components supplied to the unit during the on-gas period;

(5) the constant for the particular heating unit, represented by heating losses, heat conductivity, etc.

The above values can be measured and can be used in various calculations the result of which can be derived from a suitable computer e.g. as known from U.S. Pat. 2,877,445. The introduction of these values into a computer is carried out in the following way:

The amount of cold wind fed into the unit 1 which is on wind is measured or sensed by the orifice 23 and the result is transmitted by the transmitter 42 (FIG. 2) through a connection 43 to a master computer 34 of above type. The value can be transmitted through the transmission 43 either electrically or pneumatically.

The adjusted temperature of the mixed gases flowing through the hot conduit 8 downstream of the junction 13 is sensed by the temperature transmitter 31 which transmits the sensed temperature not only to TRC 15 but also through the pneumatic or electrical connection 35 to the master computer 34.

By means of TIA (temperature indicator alarmer) 20 the minimum permissible hot blast temperature is sensed and is transmitted as a signal to the time-differential computer 21 through the connection 37. In the time-differential computer 21, also of the above type, the actual on-wind time and the preselected, desired, on-wind time are compared and the particular time differential is transmitted into the master computer 34 to be used as a calculating value therein.

The actual amount of heat supplied to the unit which is on gas is essentially dependent upon the heating value of the combustible gases and upon the density and pressure of these gases. Mathematically, this amount of heat can be represented by the equation $$Q = \frac{Hu}{\sqrt{dv}} \sqrt{P}$$

In this equation $Hu$ is the lower heating value of the combustible gases, $dv$ is the density of the gas with reference to a density value of 1 for air, and $P$ is the actual gas pressure. The result of this equation is known in the art as the expanded Wobbe number $We$.

The values of the above equation will fluctuate during operation of the structure. Therefore, the resulting Wobbe number $We$ is measured by the Wobbe number measuring device $WeR$ 38 and is transmitted through the connection 39 to the master computer 34. It will be noted that the device 38 is connected to the conduit 4 so as to detect fluctuations of the flow in the blast furnace gas or other combustible gas which flows to the unit which is on gas.

The so-called Cowper constant C, which is a constant for the characteristics of a particular heating unit, is determined for each heating unit by suitable measurements and is then manually introduced into the master computer 34 by a suitable device such as a manually-adjustable potentiometer 40.

The above-described values which are transmitted to the master computer are used therein to determine the value at which FRC 18 should be set, and this setting is made automatically through the connection 41. It is the job of the computer 34 to determine the amount of heat required to heat the unit which is on gas to a predetermined extent in a given period of time in the most efficient way. Of course, in order to maintain heat losses at a minimum, the heating takes place with a constant excess of combustible air delivered through the conduit 5. Of course, the above considerations are made on the assumption that the amount of combustible air delivered through the conduit 5 will be determined in accordance with the amount of combustible gas delivered through the conduit 4, but it is of course possible to operate the structure in such a way that the amount of combustible gas delivered through the conduit 4 will always depend upon the amount of air delivered through the conduit 5.

Thus, with the structure of the invention it becomes possible to provide a thermal balance in a fully automatic manner without requiring any manipulations beyond the initial settings which simply produce the amount and temperature desired of the heated fluid. Even when the installation is operated at less than a full load, the structure of the invention will maintain the gas exhausting through the valves 30 when the assemblies are on gas at the lowest possible average temperature, and in this way the loss, which principally results from the heat which goes out with the gas discharging when a heating assembly is on gas, is maintained at the lowest possible level.

It is a characteristic of the structure of the invention that the on-wind step of each cycle will be automatically maintained practically constant quite independently of the amount and temperature of the heated fluid which is delivered by the hot conduit means 8 to the device which requires the heated fluid, and furthermore the extent to which the assemblies are charged with heat is substantially equal to the extent required to provide the desired heat output. Thus, while making full use of the heat exchanging properties of the heating assemblies, it is possible with the invention to maintain the temperature of the exhaust gas as low as possible and thus the best possible efficiency at the lowest possible cost can be achieved.

It will be understood that each of the elements described above, or two or more together, may also find a useful application in other types of heating installations differing from the types described above.

While the invention has been illustrated and described as embodied in automatically controlled heating installations, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. In a heating installation, in combination, a plurality of heating assemblies adapted to carry out two-step cycles each of which includes an on-wind step followed by an on-gas step with at least one of said assemblies being on wind while at least one other assembly is on gas, each of said assemblies including a heating means, for heating the assembly when on gas, and a control means connected to the heating means for controlling the amount of heat supplied by said heating means; and calculating means set to provide a predetermined duration of said on-wind step of each cycle and comparing the actual duration of said on-wind step with said predetermined duration, said calculating means automatically adjusting the control means of any of said assemblies which is on gas to regulate the heat provided by the heating means of each assembly which is on gas inversely with any existing difference between the actual duration and the predetermined duration of said on-wind step in such a manner that such existing difference is automatically reduced toward zero.

2. In a heating installation, in combination, a plurality of heating assemblies adapted to carry out two-step cycles each of which includes an on-wind step followed by an on-gas step with at least one of said assemblies being on wind while at least one other assembly is on gas, each of said assemblies including a heating means, for heating the assembly when on gas, and a control means connected to the heating means for controlling the amount of heat supplied by said heating means; hot conduit means communicating with said plurality of heating assemblies for receiving heated fluid from whichever one of said assemblies is on wind at any given time and for delivering the heated fluid to a desired location; cold conduit means also communicating with said plurality of heating assemblies for delivering to whichever one of said assemblies is on wind at any given time cold fluid to be heated and delivered to said hot conduit means; mixing conduit means communicating with said cold conduit means upstream of said heating assemblies and with said hot conduit means downstream of said heating assemblies for delivering to said hot conduit means cold fluid for reducing the temperature of the fluid in said hot conduit means; regulating means cooperating with said mixing conduit means for automatically regulating the amount of cold fluid mixed with the hot fluid in said hot conduit means to maintain the temperature of the hot fluid substantially constant during the on-wind step of each cycle; sensing means operatively connected to one of the latter two conduit means for sensing the end of the on-wind step of a given cycle; and calculating means set to provide a predetermined duration of said on-wind step, said calculating means being actuated by said sensing means for comparing the actual duration of said on-wind step with said predetermined duration thereof, and said calculating means being operatively connected to said control means of each assembly for automatically adjusting the control means of any of said assemblies which is on gas to regulate the heat provided by the heating means of each assembly which is on gas inversely with any existing difference between the actual duration and the predetermined duration of said on-wind step in such a manner that such existing difference is automatically reduced toward zero.

3. In a heating installation, in combination, a plurality of heating assemblies adapted to carry out two-step cycles each of which includes an on-wind step followed by an on-gas step with at least one of said assemblies being on wind while at least one other assembly is on gas, each of said assemblies including a heating means, for heating the assembly when on gas, and a control means connected to the heating means for controlling the amount of heat supplied by said heating means; hot conduit means communicating with said heating assemblies for receiving heated fluid therefrom and for delivering the heated fluid to a desired location; cold conduit means also communicating with said plurality of heating assemblies for delivering cold fluid thereto to be heated therein, said cold and hot conduit means communicating at any given moment with that one of said heating assemblies which is on wind; mixing conduit means communicating with said cold conduit means upstream of said heating assemblies and with said hot conduit means downstream of said heating assemblies for delivering cold fluid to said hot conduit means for reducing the temperature of the fluid therein; regulating means cooperating with said mixing conduit means for automatically regulating the latter to automatically provide during each on-wind step an amount of fluid delivered from said mixing conduit means to said hot conduit means which will maintain the fluid in the latter at a substantially constant temperature during the on-wind step; sensing means operatively connected to said hot conduit means upstream of the connection thereof with said mixing conduit means for sensing the end of an on-wind step of a given cycle; and calculating means set to provide a predetermined duration of each on-wind step, said calculating means being actuated by said sensing means for comparing the actual duration of said on-wind step with said predetermined duration thereof, and said calculating means being operatively connected with each of said control means for automatically adjusting the control means of any of said assemblies which is on gas to regulate the heat provided by the heating means of each assembly which is on gas inversely with any existing difference between the actual duration and the predetermined duration of said on-wind step in such a manner that such existing difference is automatically reduced toward zero.

4. In a heating installation, in combination, a plurality of heating assemblies adapted to carry out two-step cycles each of which includes an on-wind step followed by an on-gas step with at least one of said assemblies being on wind while at least one other assembly is on gas, each of said assemblies including a heating means, for heating the assembly when on gas, a gas conduit communicating with each heating means for delivering a combustible gas thereto, and a control means operatively connected to each gas conduit for controlling the amount of gas flowing therethrough and thus controlling the amount of heat supplied by said heating means; and calculating means set to provide a predetermined duration of said on-wind step of each cycle and comparing the actual duration of said on-wind step with said predetermined duration, said calculating means automatically adjusting the control means of any of said assemblies which is on gas to regulate the heat provided by the heating means of each assembly which is on gas inversely with any existing difference between the actual duration and the predetermined duration of said on-wind step in such a manner that such existing difference is automatically reduced toward zero.

5. A heating installation for providing a hot blast to be used with a blast furnace, for example, in combination, a plurality of heating assemblies adapted to carry out two-step cycles each of which includes an on-wind step followed by an on-gas step with at least one of said assemblies being on wind while at least one other assembly is on gas, each of said assemblies including a heating means, for heating the assembly when on gas, and a control means connected to the heating means for controlling the amount of heat supplied by said heating means; hot conduit means communicating with said heating assemblies for receiving the hot blast from whichever one of said assemblies is on wind and for delivering the hot blast to a blast furnace; cold conduit means communicating with said assemblies for delivering thereto cold air to be heated in whichever assembly is on wind and delivered in heated condition to said hot conduit means from whichever assembly is on wind; mixing conduit means communicating with said cold conduit means upstream of said assemblies and with said hot conduit means downstream of said assemblies for delivering to said hot conduit means cold air which reduces the temperature of the hot blast; regulating means cooperating with said mixing conduit means for regulating the latter during each on-wind step to deliver from said mixing conduit means to said hot conduit means an amount of cold air which will maintain the temperature of the hot blast substantially constant throughout each on-wind step; sensing means cooperating with said hot conduit means upstream of the connection thereof with said mixing conduit means for sensing the end of each on-wind step; and calculating means set to provide a predetermined duration for each on-wind step and actuated by said sensing means for comparing the duration of the actual on-wind step with the predetermined duration thereof, said calculating means being operatively connected to each control means for automatically adjusting the control means of any of said assemblies which is on gas to regulate the heat provided by the heating means of each assembly which is on-gas inversely with any existing difference between the actual duration and the predetermined duration of each on-wind step in such a manner that such existing difference is automatically reduced toward zero.

References Cited by the Examiner
UNITED STATES PATENTS

| | | | |
|---|---|---|---|
| 1,816,174 | 7/31 | Brown | 263—19 |
| 2,931,635 | 8/60 | Braun et al. | 263—19 |
| 3,034,775 | 5/62 | Jansen et al. | 263—19 |
| 3,051,465 | 8/62 | Jansen et al. | 263—19 |

CHARLES SUKALO, *Primary Examiner.*